Sept. 25, 1956 A. F. O'CONNOR ET AL 2,764,035
HAND BRAKE FOR FLAT CARS
Filed Jan. 10, 1955
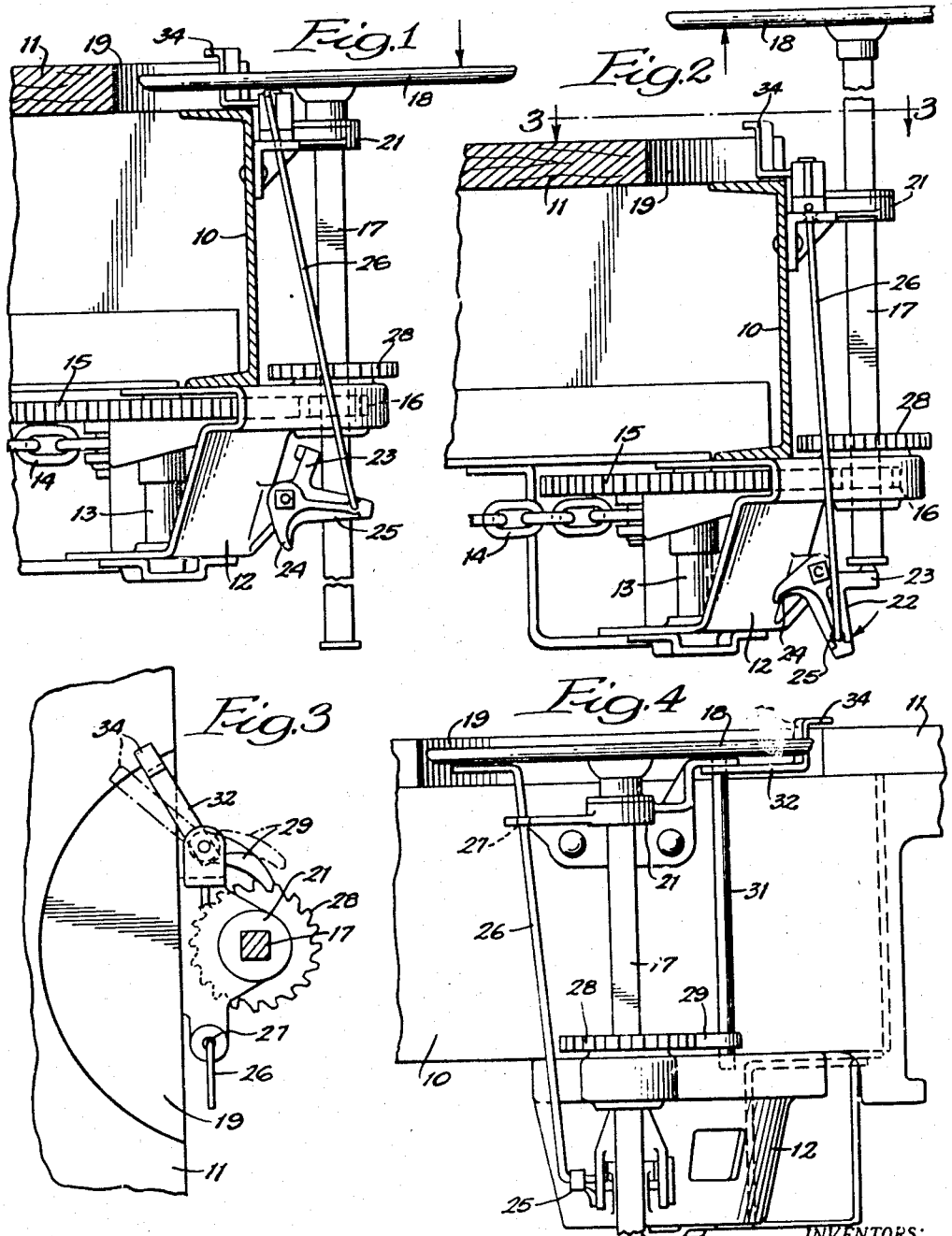

United States Patent Office 2,764,035
Patented Sept. 25, 1956

2,764,035

HAND BRAKE FOR FLAT CARS

Arthur F. O'Connor, Chicago, and Gust J. Christenson, Park Ridge, Ill., assignors to Union Asbestos and Rubber Co., Chicago, Ill., a corporation of Illinois Application January 10, 1955, Serial No. 480,831

5 Claims. (Cl. 74—510)

This invention relates to a hand brake for flat cars and more particularly to a drop shaft type of brake.

Flat cars have heretofore been commonly equipped with hand brakes of the drop shaft type in which the handwheel is raised to a convenient operating position above the floor of the car or lowered to an inoperative or storage position substantially flush with the floor of the car where it is out of the way. The handwheel and its shaft have been held in raised position by a pivoted shaft support engaging the lower end of the shaft and movable out of registry therewith to permit lowering. A ratchet mechanism has also been provided to hold the shaft against accidental brake releasing movement and which can be disengaged when desired for releasing the brake.

As heretofore constructed, it has been necessary for the operator to get beneath the end of the car to release the shaft support so that the shaft and handwheel can be lowered. It is also necessary to get beneath the car or to reach substantially below the level of the car top to release the ratchet. Not only are these operations slow and dangerous, but they may become impossible of performance when the cars are on depressed loading tracks.

It is therefore one of the objects of the present invention to provide a hand brake for flat cars in which all of the necessary operations in connection with the hand brake, including release of the shaft support and control of the ratchet can easily be performed by an operator on the floor of the car.

Another object is to provide a hand brake in which the shaft support is moved to released position by an operating rod pivoted to the shaft support and terminating at a level adjacent to the floor of the car.

A further object is to provide a hand brake in which the ratchet mechanism is controlled through an operating lever projecting to or slightly above the level of the floor of the car to be engaged and moved by the foot of an operator.

The above and other objects and features of the invention will be more readily apparent when viewed in connection with the accompanying drawing, in which:

Figure 1 is a partial longitudinal section through a flat car equipped with a hand brake embodying the invention with parts in elevation;

Figure 2 is a view similar to Figure 1 showing the parts in position with the hand wheel raised;

Figure 3 is a partial section on the line 3—3 of Figure 2; and

Figure 4 is an end elevation looking from the right of Figure 1.

The invention is applied to a conventional flat car having a transverse end beam 10 and a flat floor 11 supported on the car framework to receive a load. The end beam 10 carries a brake housing 12 rigidly secured beneath the beam at the end of the car. The housing supports a drum shaft 13 upon which a chain 14 may be wound to apply the brake. The drum shaft carries a gear 15 meshing with a pinion 16 which can be turned through the handwheel mechanism to turn the drum and control application and release of the brake.

The pinion 16 is in the form of a sleeve member rotatably mounted in the housing 12 in mesh with the gear 15 and is formed with a center opening which is square or of other non-circular shape. A handwheel shaft 17 extends slidably through the pinion and at its upper end carries a handwheel 18 so that when the handwheel and shaft are turned the pinion 16 will be turned. At the same time, the shaft 17 can be slid vertically through the pinion to either a raised operating position of the handwheel or a lowered storage position.

As shown in Figure 1, the handwheel is in its lowered storage position wherein the handwheel itself fits into a cut out, partially circular portion 19 in the floor of the car so that the handwheel lies substantially flush with or slightly below the floor level. At this time, the shaft 17 projects substantially below the pinion 16. When the handwheel is raised, as shown in Figure 2, the lower end of the shaft 17 will project until slightly below the pinion 16 and the handwheel 18 will extend above the floor of the car to a convenient operating height. The shaft 17 may be supported and guided by a bracket 21 secured to the end of the car adjacent the top thereof.

The shaft and handwheel are held in elevated operating position by a shaft support 22 pivoted on the housing 12 and having a projecting arm 23 to lie beneath the end of the shaft when the shaft is elevated. An additional projecting arm 24 on the shaft support is engageable with the housing 12 to limit clockwise swinging movement of the shaft support to the position shown in Figure 2 wherein the arm 23 lies beneath the end of the shaft to hold the shaft elevated. When the shaft is to be lowered, the shaft support is swung to the position shown in Figure 1 with the arm 23 out of registry with the shaft so that the shaft can drop down. At this time, the end of the arm 23 engages the side of the shaft to hold the shaft support in its inoperative position. Normally, the shaft support is so balanced that when the shaft is raised, it will drop by gravity to its locking position shown in Figure 2 and must be manually returned to its releasing position shown in Figure 1 to permit lowering of the shaft.

In brake constructions, as heretofore provided, it was necessary for the operator to reach beneath the car to move the shaft support to its inoperative position. According to the present invention, the shaft support can be controlled from the floor of the car so that the necessity of reaching or crawling beneath the car is eliminated.

For this purpose, the shaft support is provided with a third arm 25 lying in a substantially horizontal position when the shaft support is released, as shown in Figure 1, and dropping downward when the shaft support is engaged, as shown in Figure 2. An operating link 26 is pivoted at one end to the arm 25 and at its other end extends through a guide opening 27 in the bracket 21, as best seen in Figure 3. The upper end of the link may be bent over to provide a convenient handle, as shown.

With this construction, when the handwheel is raised and the shaft support is engaged, as shown in Figure 3, the link 26 will drop downward so that its upper bent-over end lies closely adjacent to the bracket 21. With the handwheel raised, the operator can easily reach beneath the handwheel to grip the upper end of the link 26 and raise it to the position shown in Figure 1 in which the shaft support is released. When the handwheel is released, the shaft 17 will drop downward to the position of Figure 1 so that the arm 23 of the shaft support will engage its side and will thereby be held in release or inoperative position. The necessity for the operator to crawl beneath the car is therefore eliminated and it is easily possible for the shaft to be lowered by an operator standing on the floor of the car.

To prevent accidental release of the brake, a ratchet mechanism is provided including a ratchet gear 28 rotatably mounted on the housing 12 and formed with a square opening therethrough slidably to receive the shaft 17. The ratchet gear is normally held against turning in one direction by a pawl 29 pivoted on the housing in a position to engage the ratchet gear. When the ratchet gear and the shaft are turned clockwise, as seen in Figure 3, to apply the brake, the pawl will release and permit free turning of the mechanism. However, the pawl 29 will engage the ratchet gear to prevent accidental turning of the shaft in the brake releasing direction until the pawl is positively moved away from the ratchet gear to enable release of the brake.

For convenient control of the pawl, the pawl is secured to a vertical shaft 31 which is journalled at its opposite ends to the housing 12 and the bracket 21, as best seen in Figure 4. At its upper end, the shaft 31 carries an operating lever 32 which is offset upwardly at its outer end, as indicated at 33, and which terminates in a short horizontal portion 34 overlying the floor of the car adjacent the recess 19 therein. The end portion 34 of the lever can conveniently be engaged by the foot of an operator thereby to turn the pawl 29 to either its engaging or releasing position so that the brake can be held engaged or can be released easily and quickly as desired.

While one embodiment of the invention has been shown and described in detail it will be understood that this is for illustration only and is not to be taken as a definition of the scope of the invention, reference being had for this purpose to the appended claims.

What is claimed is:

1. A hand brake for flat cars comprising a housing secured to the flat car below the top thereof and including a rotatable sleeve member, a vertical hand brake shaft extending slidably through the sleeve member, a handwheel on the upper end of the shaft, the shaft being slidable vertically from an upper position in which the handwheel is spaced above the top of the flat car to a lower position in which the handwheel is substantially flush with the top of the flat car, a shaft support pivoted on the housing to move from a retracted position out of registry with the shaft to an operative position underlying the end of the shaft to hold the shaft in its upper position, and a vertically elongated operating rod pivotally connected to the shaft support and extending upward therefrom with its upper end terminating adjacent to the level of the floor of the car so that an operator can move the shaft support through the operating rod from a position on the floor of the car.

2. A hand brake for flat cars comprising a housing secured to the flat car below the top thereof and including a rotatable sleeve member, a vertical hand brake shaft extending slidably through the sleeve member, a handwheel on the upper end of the shaft, the shaft being slidable vertically from an upper position in which the handwheel is spaced above the top of the flat car to a lower position in which the handwheel is substantially flush with the top of the flat car, a shaft support pivoted on the housing to move from a retracted position out of registry with the shaft to an operative position underlying the end of the shaft to hold the shaft in its upper position, the shaft support normally falling by gravity to its operative position and engaging the housing thereby to limit its pivotal movement in one direction, and an operating rod pivoted at its lower end to the shaft support and terminating at its upper end adjacent to the level of the floor of the car so that an operator on the floor of the car can move the shaft support to its retracted position, the shaft support engaging the side of the shaft when the shaft is in its lower position to hold the shaft support in its retracted position.

3. A hand brake for a flat car comprising a housing secured to the flat car below the top thereof and including a rotatable sleeve member, a vertical hand brake shaft extending slidably through the sleeve member, a handwheel carried by the upper end of the shaft, the shaft being slidable from an upper position in which the handwheel is spaced above the car top to a lower position in which the handwheel is substantially flush with the car top, a ratchet gear slidably but non-rotatably mounted on the shaft and lying below the top of the flat car, a pawl pivotally mounted on a vertical axis engageable with the ratchet gear to prevent rotation thereof in one direction, a vertical shaft secured to the pawl and terminating adjacent to but below the floor of the car, and an operating lever secured to the upper end of the vertical shaft and having its outer end upturned to project above the floor of the car beyond the periphery of the handwheel for operation by the foot of an operator.

4. A hand brake for a flat car comprising a housing secured to the flat car below the top thereof and including a rotatable sleeve member, a vertical hand brake shaft extending slidably through the sleeve member, a handwheel carried by the upper end of the shaft, the shaft being slidable from an upper position in which the handwheel is spaced above the car top to a lower position in which the handwheel is substantially flush with the car top, a shaft support pivoted on the housing movable from a retracted position out of registry with the shaft to an operative position underlying the end of the shaft, a vertically elongated operating rod pivoted to the shaft support and terminating at its upper end adjacent to but below the floor of the car, a ratchet wheel slidably but non-rotatably mounted on the shaft below the level of the car floor, a pawl pivoted on a vertical axis and engageable with the ratchet wheel to prevent rotation of the shaft in one direction, and an operating lever connected to the pawl and terminating in an end above the floor of the car and spaced from the pawl axis through which the pawl can be operated by the foot of an operator.

5. A hand brake for flat cars comprising a housing secured to the flat car below the top thereof and including a rotatable sleeve, a vertical hand brake shaft extending slidably through the sleeve, a handwheel secured to the upper end of the shaft, the shaft being slidable from an upper position in which the handwheel is spaced above the floor of the car to a lower position in which the handwheel is substantially flush with the floor of the car, a ratchet gear rotatably mounted on the housing and connected to the shaft for relative sliding but held against relative rotation, a pawl pivotally mounted on the housing and engageable with the ratchet gear to hold it and the shaft against rotation in one direction, and operating means for the pawl including a vertical shaft secured to the pawl and terminating adjacent to but below the floor of the car, and an operating lever secured to the upper end of the vertical shaft and terminating in an upturned end projecting above the floor of the car and spaced from the axis of the pawl to be engaged and operated by the foot of an operator.

References Cited in the file of this patent
UNITED STATES PATENTS

| | | |
|---|---|---|
| 1,137,082 | Pries | Apr. 27, 1915 |
| 1,596,784 | Weydert | Aug. 17, 1926 |
| 1,618,098 | Lindbloom | Feb. 15, 1927 |
| 1,620,141 | Strid | Mar. 8, 1927 |